Figure 1:
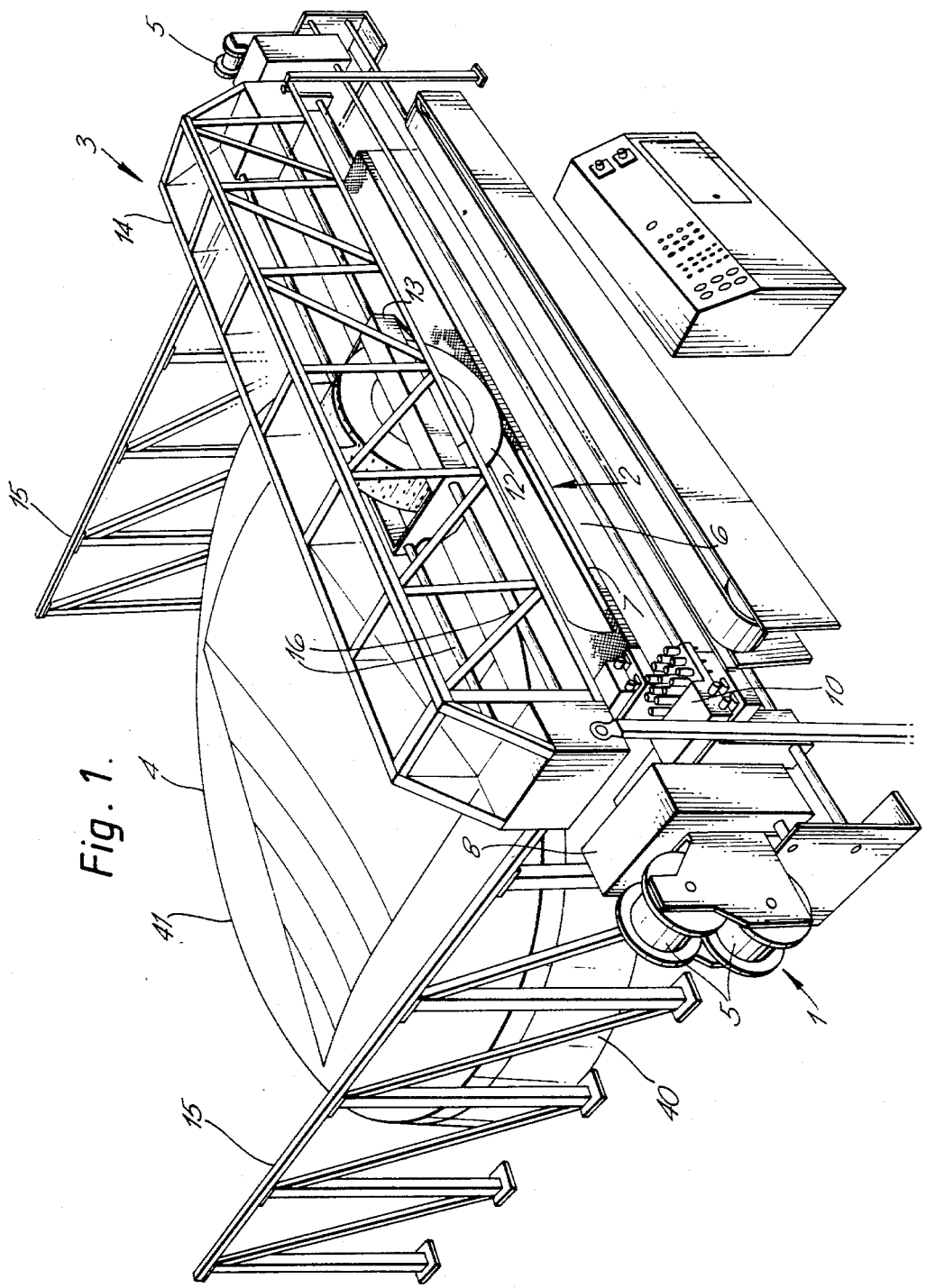

United States Patent [19]

Marlow et al.

[11] Patent Number: 4,541,886

[45] Date of Patent: Sep. 17, 1985

[54] AUTOMATIC TAPE LAYING APPARATUS

[75] Inventors: Christopher I. Marlow; Anthony R. Wiltshire, both of Wellingborough; Ivan E. Hulme, Balderstone, all of England

[73] Assignee: British Aerospace PLC, London, England

[21] Appl. No.: 585,371

[22] Filed: Mar. 2, 1984

[30] Foreign Application Priority Data

Mar. 2, 1983 [GB] United Kingdom ................. 8305749

[51] Int. Cl.⁴ ............................................. B32B 31/00
[52] U.S. Cl. .................... 156/230; 156/250; 156/265; 156/350; 156/362; 156/510; 156/574
[58] Field of Search ............................. 156/350–353, 156/361, 363, 542, 584, 510, 64, 522, 521, 235, 523, 530, 230, 574

[56] References Cited

U.S. PATENT DOCUMENTS

| 3,810,805 | 5/1974 | Goldsworthy | 156/361 |
| 4,208,238 | 6/1980 | August | 156/523 X |
| 4,255,218 | 3/1981 | Stageberg | 156/584 X |
| 4,292,108 | 9/1981 | Weiss et al. | 156/361 |
| 4,491,493 | 1/1985 | Eaton | 156/361 X |

Primary Examiner—David Simmons
Attorney, Agent, or Firm—Cushman, Darby & Cushman

[57] ABSTRACT

Automatic tape laying apparatus for laying epoxy resin impregnated carbon fibre tape includes a table onto which lengths of tape are laid for profiling to shape and size, a curved form tool on which the profiled lengths of tape are laid-up to form an article to be cured, a roller to transfer the profiled lengths from the table to the tool and to effect laying-up thereon, the roller having suction ducts on its surface to hold the lengths of tape in place during transfer which suction is progressively de-activated and replaced with blowing as the roller is rolled over the form tool and progressively lays-up the profiled tape onto the tool.

18 Claims, 15 Drawing Figures

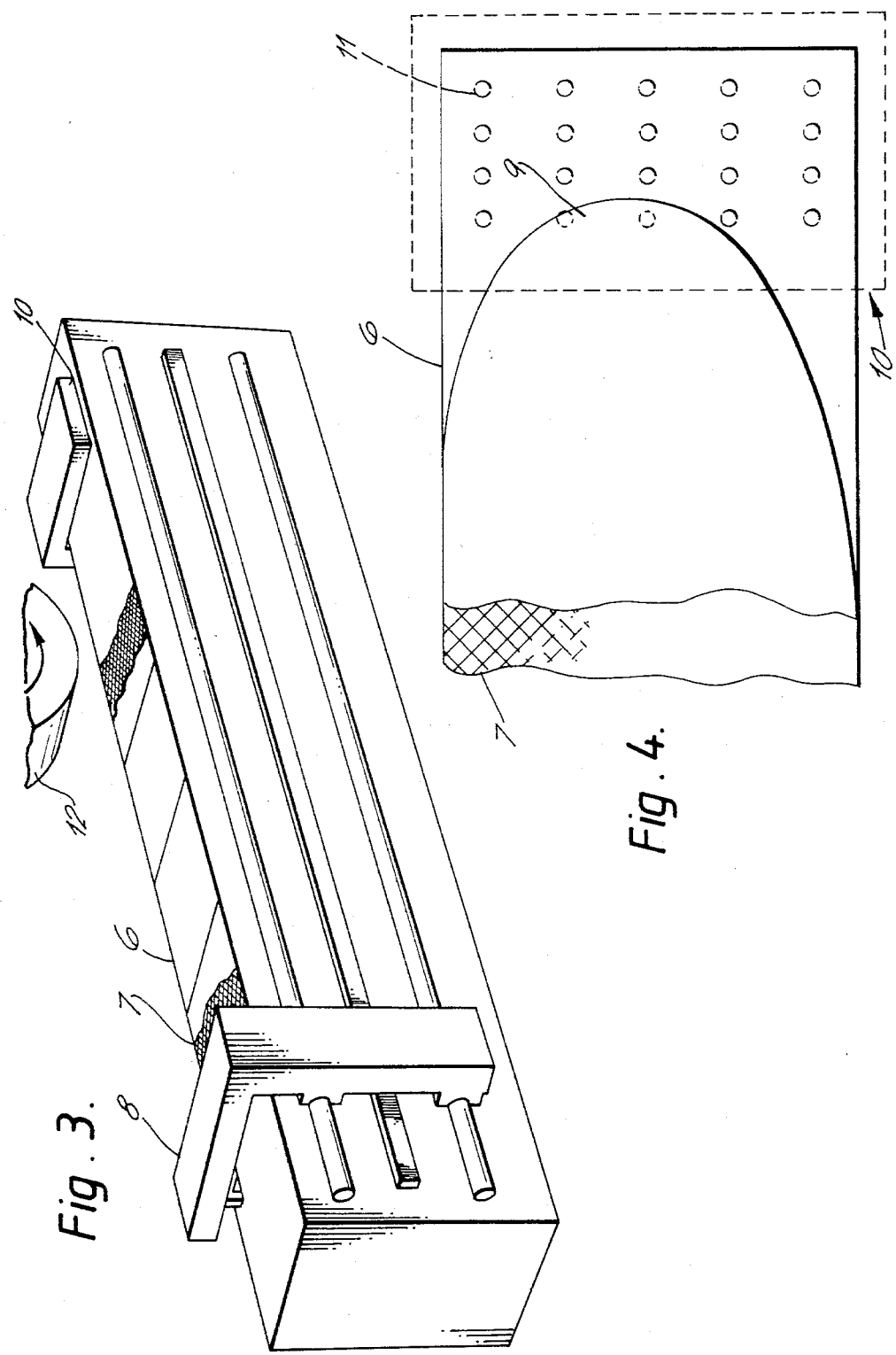

AUTOMATIC TAPE LAYING APPARATUS

This invention relates to automatic tape laying apparatus. Where articles are formed by one or more layers of fibre reinforced plastics materials, for example glass or carbon composite materials, the uncured layers are laid-up, one upon the other, on the surface of a shaped tool and then cured to form the rigid article which is then removed from the tool. The layers are formed by lengths of tape lying side-by-side.

Whilst the articles to be formed are sometimes planar and thus are readily laid-up, where curved articles are to be formed substantial difficulties are found to exist.

If a length of tape is laid-up on a curved surface, there is a natural line on which its centre line will tend to lay. If a further length of tape is laid-up to one side of the original length and allowed to follow its natural line parallelism will not exist between the adjacent edges. Similarly, if yet further lengths are laid in side-by-side relationship parallelism also will not exist.

One answer to this is to cut each length of tape with slightly curved edges to compensate. Whilst quite feasible, and even desirable in certain circumstances, this is found to be generally undesirable in a production process because each curve would require to be programmed and each would require to be individually cut; thus wasting time and creating expense. Thus it is an objective of the present invention to provide automatic tape laying apparatus by which parallel sided tape portions can be accurately laid-up in abutting side-by-side relationship, but by which tape portions of other shapes can be also laid-up. Furthermore, it is an important objective that tape portions are progressively laid so that air is not trapped under the tape layers.

Since the apparatus is required for use with a variety of shaped tools and the tape portions require to have regions profiled in plan accordingly, and also the tapes require to be inspected for faults prior to such profiling, the apparatus is provided with surface means upon which the tapes are initially placed in preparation for laying-up. Once the length of tape has been so prepared, it is desirable to disturb it as little as possible since each time it is picked-up errors of positioning occur. Thus it is an object of the present invention to provide apparatus with transfer means which will pick up the profiled length of tape from the surface means and transfer it to the tool with a high degree of accuracy within the limits of flexibility of the tape portion.

According to the present invention, automatic tape laying apparatus includes surface means onto which portions of tape are laid for profiling to shape and size, tool means on which the profiled portions are laid-up to form an article to be cured, and transfer means for transferring the profiled portions from the surface means to the tool means and effecting laying-up thereon, the transfer means comprising carrier means having a generally arcuate surface region, drive means to roll the carrier means over a portion of tape upon the surface means, holding means arranged to hold the tape portion against the arcuate surface of the carrier means as the carrier means is rolled over said portion, traversing means to traverse the carrier means to a laying-up position over the tool means, said drive means effective to roll the carrier means over the tool, and means to release progressively regions of the carried portion of tape as those regions lie between the arcuate surface and the tool means whereby the tape portion is progessively laid-up upon the tool means.

Preferably, the arcuate surface of the carrier means is continuous so that the carrier means is in the form of a roller or drum.

Preferably, the holding means comprises a suction arrangement, in this case the arcuate surface is perforated to allow the tape portions to be drawn to said surface.

The arcuate surface is preferably compliant to adapt to various contours of the tool means.

Figure 2:
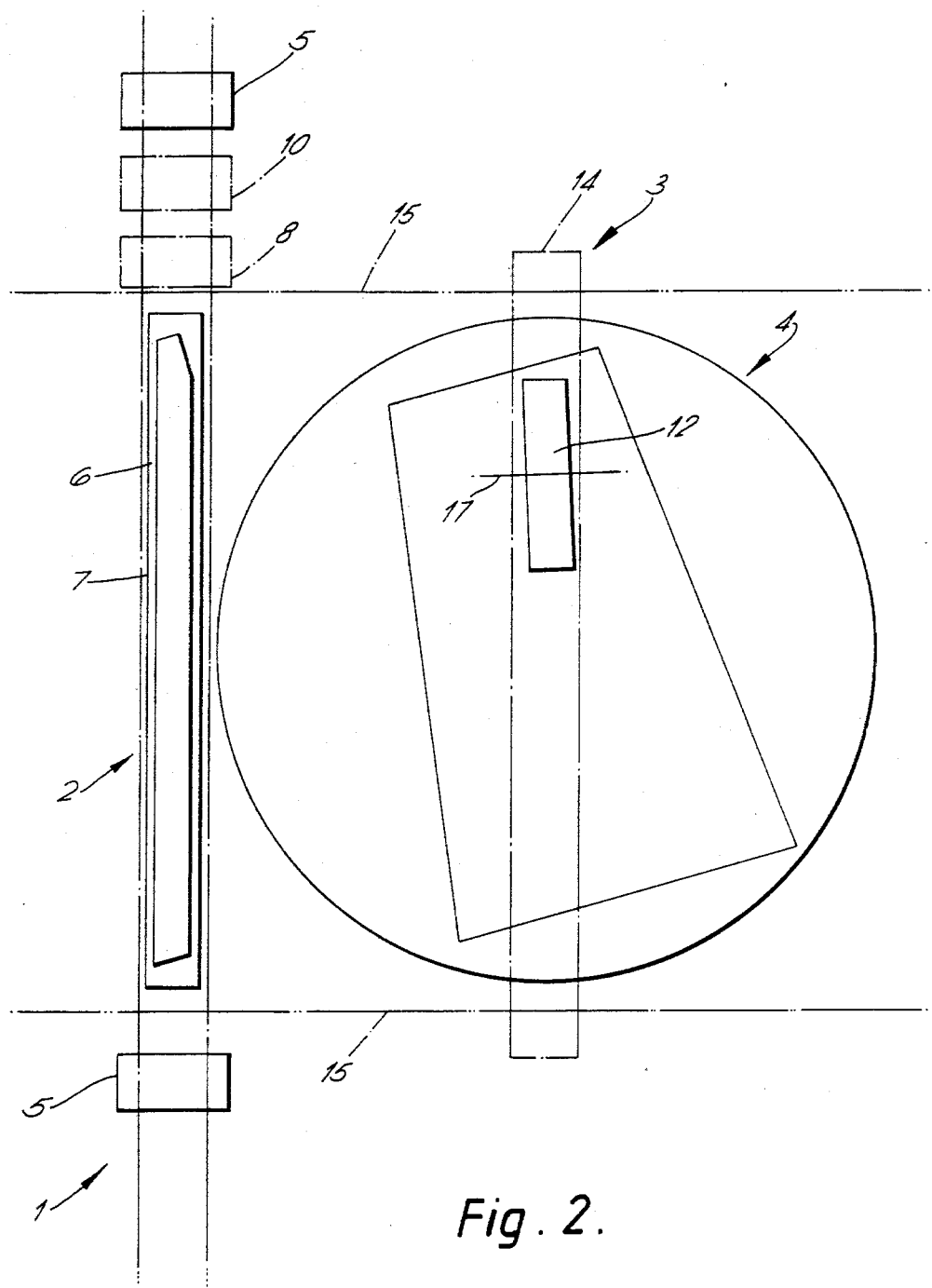
Figure 5:
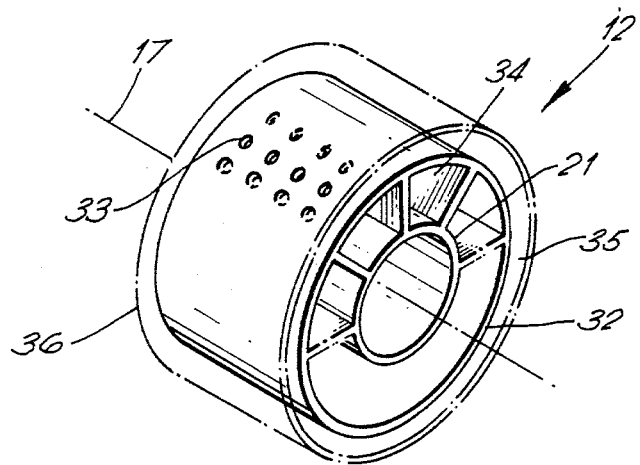
Figure 6:
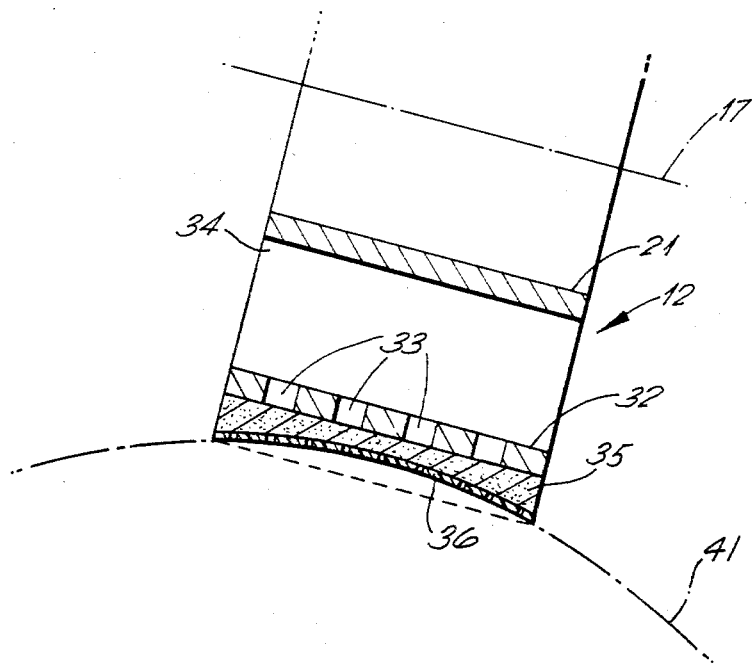
Figure 7:
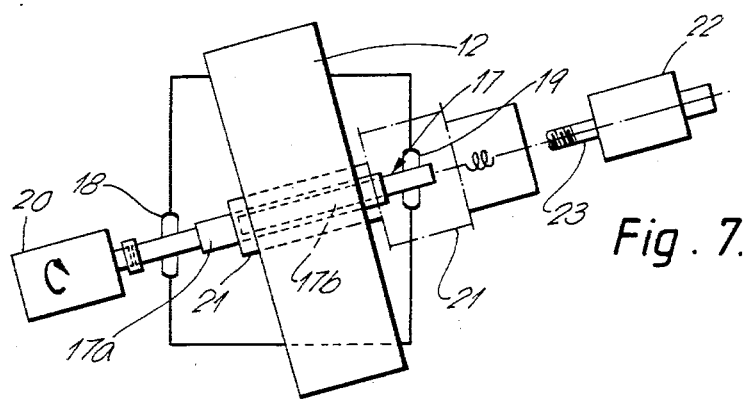
Figure 8:
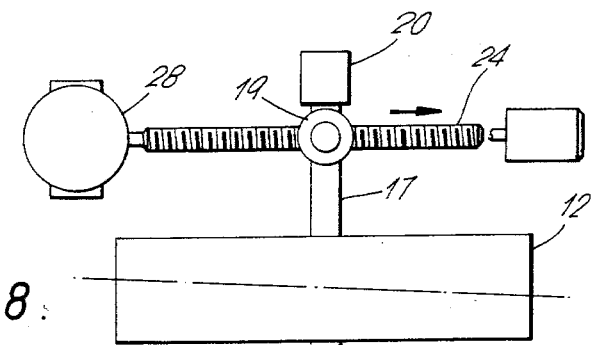
Figure 9:
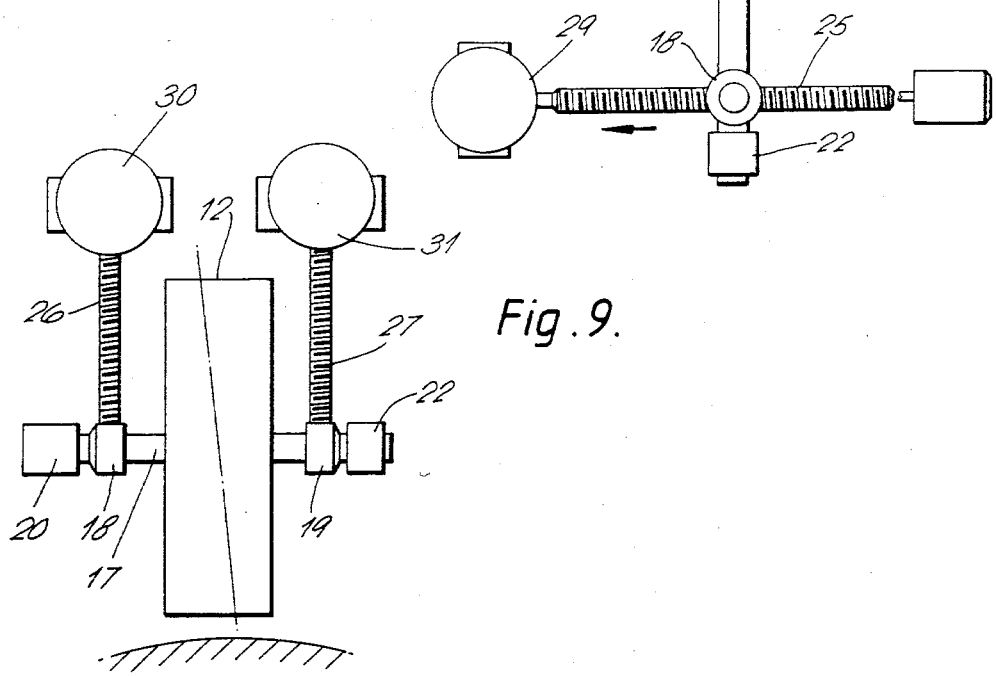

One embodiment of the invention is described by way of example with reference to the accompanying drawings in which:

FIG. 1 is a diagrammatic perspective view of automatic tape laying apparatus suitable for laying expoxy resin impregnated carbon fibre tape, FIG. 2 is a diagrammatic plan view of the apparatus, FIG. 3 is a perspective view of surface means upon which tape portions are laid for profiling, FIG. 4 is a plan view of said surface means, FIG. 5 is a detailed perspective view of carrier means, FIG. 6 is a cross-section of the carrier means, FIG. 7 is a plan view of the carrier means, FIG. 8 is a further plan view of the carrier means, FIG. 9 is an end view of the carrier means, and FIGS. 10 *a-f* are diagrammatic views of an alternative carrier means.

Referring to the drawings, automatic tape laying apparatus comprises four distinct sections. The first is a dispensing section.

The tape, for example resin pre-impregnated carbon fibre, is received from the manufacturers on standard reels. Thus a dispensing section 1 is provided which arranges that the reels are so anchored that the tape can be inspected and presented as strips or portions of good quality and totally usable for laying-up purposes.

The second is a profiling section 2 which receives the portions of tape and provides a datum surface on which the portions can be profiled. Other functions of this section include scrap removal, i.e. removal of those pieces of tape not used in the final lay-up of the product, and profile accuracy checking.

The third section is a transfer section 3 which is able to pick up individual portions of tape after profiling from the profiling section and transfer them to the vicinity of forming tool, and to place, that is to say lay-up, the individual portions on the tool in precise and specific positions.

The fourth section is a tool section 4 which includes both a selection of individual tools and a carrier/orientator therefore.

The dispensing section 1 includes two tape dispensers 5 which accept the standard reels of tape. Whilst one dispenser is being used to dispense lengths of tape, the other can be re-loaded with a new reel.

The dispensers are arranged to traverse the profiling section 2 and to lay tape thereon, severing it where desired, taking into account flaws in the tape material which may already be marked by the manufacturer or which may become apparent as dispensing occurs. If, as is usual, the tape as delivered comprises the carbon fibre resin impregnated layer backed by protective sheets, then the protective sheets are automatically removed during dispensing. When a length of tape has been dispensed onto the profiling section 2, the dispensers 5 are parked to one end or the other as illustrated in FIG. 2, leaving the way clear for profiling and subsequent transfer. As profiling will be referenced to one edge of the tape, the position of the tape on the profiling section must be carefully controlled. Accordingly, an optical or mechanical edge sensor slaved to a compensating arrangement which arranges lateral movement of the tape being dispensed is provided.

The profiling section 2 includes a planar datum table 6 upon which the lengths of tape are laid during dispensing.

The working surface of the table is formed by a layer of rigid aluminium honeycomb material 7 lying with the axes of its honeycomb cavities normal to the working surface.

As previously mentioned, the tape lengths are accurately positioned upon the surface and require to be so maintained until picked up by the transfer section 3.

Thus means are provided to draw air through the honeycomb material to draw and hold the dispensed tape lengths onto the surface. The honeycomb material is zoned such that the air suction can be stopped locally for purposes to be described.

Once the flawless portion of tape has been accurately dispensed onto the surface of the table, it can then be suitably profiled. FIGS. 3 and 4 illustrate this activity. Profiling is achieved in known manner by a computer controlled laser beam, the laser being carried in a profiling cutting head 8. Alternatively, known water jet or reciprocating knife arrangements could be used. A typical profile is shown at 9 in FIG. 4. The aluminium honeycomb layer 7 is found to be resistant to the laser beam since the beam impinges only momentarily on any edge region. The air suction conveniently removes any minor debris or fumes resulting from the cutting process.

Scrap tape material is removed prior to pick-up of the profiled tape portion by the transfer section 3 by means of a scrap removal system. This includes a traversable scrap removal head 10 which in use will follow the cutting head 8 as that passes along the table 6.

The head 10 comprises a matrix of independently actuable pins 11 with pointed ends which project and are urgable downwards to pierce the fibrous scrap material. Those pins lying above the profiled portions of the tape are prevented from actuation. The pins, due to their pointed nature, are found to deflect away from the walls of the honeycomb layer 7.

Having penetrated, the pins lift the scrap material (the pin taper and natural tackiness of the tape ensure lifting) and the matrix is then moved bodily away from the table 6 to a scrap conveyer region where sharp edged strippers which slide down around each pin ensure scrap removal. The movement of the matrix is always away from the profiled portions of tape, so that no scrap material can fall onto the profiled tape.

To allow easy scrap remnoval, the suction on the table 6 is stopped in the region of the traversing scrap removal head 10.

The transfer section 3 primarily comprises carrier means in the form of a wheel or roller 12 and the mounting/traversing/drive means therefore.

The roller 12 is carried for rotation about a generally horizontal axis on a mounting head 13 which is itself mounted upon a gantry 14. The gantry extends the full length of the table 6 and is carried for lateral translation from the profiling section 2 to the tool section 4 on spaced horizontal tracks 15.

The mounting head 13 traverses the full length of the gantry on rails 16.

In addition to these rotational, translation and traversing movements, the roller 12 is capable of various articulations with respect to the head 13, the sum of these articulations enabling the roller to lay tape portions accurately beside other previously laid tape portions irrespectively, within limits, of the contour of the tool surface.

To this end, the roller 12 has an axle 17 (FIGS. 7, 8, 9) carried by spaced self-aligning bearings 18, 19. The axle 17 is in two parts 17a, b portions of which are in splined male/female relationship to effect positive rotational drive between the two parts, but to allow relative axial movement during articulation of the roller.

Coupled to one end of the axle 17 is a stepping motor 20 which provides a rotational drive for the roller.

The wheel itself is mounted upon a sleeve 21 concentric with the axle by means of which the wheel can be moved axially with respect to the axle and hence to the head 13. Such axial movement is effected by a servo motor 22 driving a screw jack 23.

The bearings 18, 19 are themselves movable in two planes by means of two screw jacks 24, 25 lying in a horizontal plane (FIG. 8), and two screw jacks 26, 27 lying in a vertical plane (FIG. 9). The screw jacks are operated by servo motors 28, 29 and 30, 31 respectively.

Simultaneous operation of the screw jacks 26, 27 in the same sense effects vertical movement of the roller 12 whilst differential operation effects tilting movement, shown in FIG. 9.

Differential operation of the screw jacks 24, 25 effects steering of the roller 12, as shown in FIG. 8.

The roller 12 is constructed as shown diagrammatically in FIGS. 5 and 6. The axis of the axle 17 is shown for reference purposes only. The roller has a rigid peripheral drum member 32 which has apertures 33. Its interior is divided into segmental chambers 34 such that the segments are in flow connection with the apertures of certain peripheral regions. On the exterior of the drum member 32 is a compliant and porous annulus 35 which is itself provided with an outer layer 36 of plastics material (e.g. PTFE) chosen to reduce the adherence of the tacky tape to a minimum. This outer plastics layer 36 is also perforated.

The chambers 34 are exhausted to provide suction at the outer surface of the wheel to hold a tape portion against the wheel, and are alternatively pressurised to provide sufficient pressure to urge the tape portion away when desired. Valve means, not shown, are provided to ensure that during the laying-up process suction is maintained in those regions of the roller on which the tape portion requires to be retained but that an urging pressure is progressively provided at those regions at and approaching the tool surface.

The tool section comprises a turntable 40 on which a desired tool 41 is placed. The tool may have concave or convex surfaces or a combination of both.

Each of the layers which, as will be recalled, is formed of a plurality of parallel strips, is required to be orientated at a specific angle. Hence at certain times during the laying-up process, the turntable is rotated so that the next layer is correctly orientated with respect to the previous layer. The turntable is locked accurately in position during the laying-up of each layer.

Subsequent to completion of the laying-up process, the tool, together with the laid-up workpiece, is removed to a curing station, not shown.

In operation, the apparatus is numerically controlled to operate in the following manner by at least one programmable NC controller.

If two or more controllers are used, they are individually programmed but linked together with a software programmable interface; they move through their programmes synchronously.

Initially, a tape dispenser 5 is moved to its starting point and suction in selected zones of the honeycomb layers 7 of the table 6 is turned on. A length of tape is then dispensed onto the layer 7, the suction drawing the tape accurately down onto the honeycomb layer, and preventing longitudinal movement. Severing of the length of tape from the reel is then effected and the dispenser is moved back to a park position clear of the table 6.

At this stage, if the tape is found to be flawed, automatic removal of the tape portion is effected.

If the tape is found to be flawless, then the profiling head 8 is moved so as to cut the tape portion to a desired size and shape. Simultaneously, the scrap removal head 10 is moved from a parked position to an appropriate region and selected pins are extended to penetrate the scrap cutaway portions of tape. The suction through the honeycomb layer is stopped at the appropriate region whilst the scrap portions are lifted. At other regions, it is maintained to accurately hold that tape portion being subjected to profiling in position. After lifting, the scrap material is removed and dumped, as previously described.

This scrap removal sequence is repeated for progressive regions until the complete profile is cut by the profiling head and all scrap is removed.

The scrap removal and the profiling heads are then moved to their park positions. Naturally the suction through the honeycomb layer is maintained or re-introduced if it has been temporarily switched-off to maintain location during the programmed profiling and subsequently.

The roller 12 in the meantime is parked to one side of the table 6 or is laying-up a previously profiled portion of tape. When the scrap removal and profiling heads are duly parked, the roller 12 is then moved to a position in which its axle 17 is directly above an end of the tape. The roller 12 is rotated to a given position.

The roller 12 is then lowered to stop approximately 1 mm above the tape portion. Suction is applied to that zone of the roller directly above the tape, so that the tape end will be sucked onto the roller. The roller head 13 is then moved along the gantry 14 to a position just beyond the other end of the tape; the roller 12 being synchronised to rotate and gather tape as it rotates. Suction is initiated in successive zones of the roller as they approach the position immediately above the tape and is maintained thereafter. The suction at successive zones of the honeycomb layer 7 of the table 6 is turned off only whilst the roller is above that zone, and finally when the whole tape portion is carried by the roller.

The loaded roller is then raised from its tape gathering position and the gantry traversed to the tool section 4.

The roller is rotated so that the end of the carried tape is at a bottom centre position and is lowered towards the tool surface. Its axle will be given steering twist, tilt, height and axial compensation to suit the particular laying-up procedure, so that the roller surface adopts a position tangential to the local surface of the tool, as illustrated in FIG. 6.

As the roller descends the compliant annulus flattens and is effective to spread the tape position both laterally and longitudinally.

Suction is switched off to those successive zones of the roller nearest the tool surface, i.e. the bottom centre zone and replaced with a pressure so that the tape portion is blown from the surface of the roller. The roller rotation is synchronised with head longitudinal movement and the roller axle is steered, tilted and moved axially, so that the tape portion is laid-up along a desired path adapting to changing surface contours. When the full tape portion is laid-up, the roller is raised to either collect a further tape portion or to be moved to a parking position. If the last tape portion of a layer has been laid-up on the tool, the tool can be rotated to a further angular position to accept the next layer of preformed tape portions.

Conveniently, in the described single roller arrangement, the roller 12 is about two meters in diameter. This is suitable for up to six meter lengths of tape. If longer lengths are required to be laid-up, then a larger diameter roller 12 would be used. This is somewhat inconvenient from the structural point of view and hence a twin roller arrangement is used.

This arrangement is shown in FIGS. 10 a–f. Twin rollers 12 are mounted in heads 13 similar to those previously described. The heads are carried on the gantry 14 with a provision to move towards each other and also apart.

The techniques for the twin roller arrangement are similar to the single wheel techniques with the following exceptions.

Figure 10A:
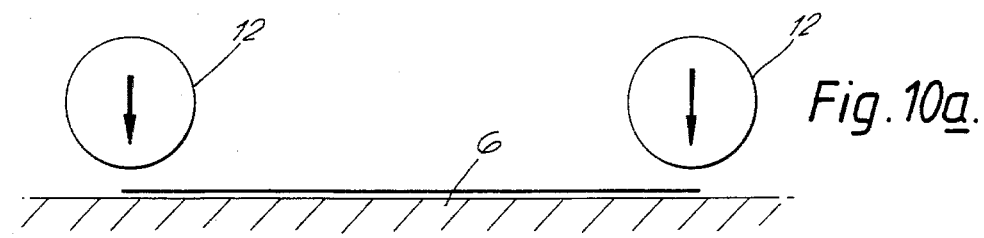
Figure 10B:
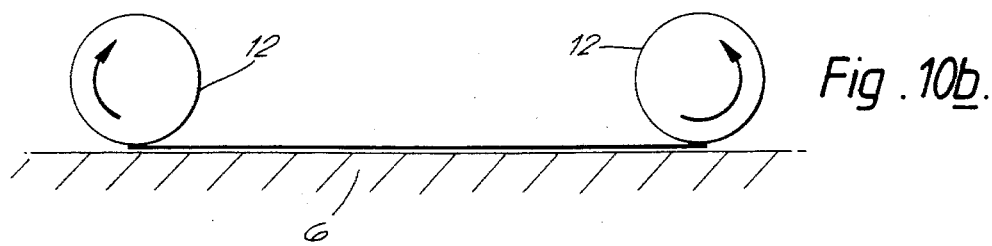
Figure 10C:
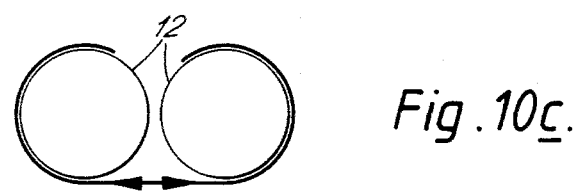

During tape pick-up from the table 6, one roller will start at each end of the tape portion, as shown in FIG. 10a and the respective heads 13 will be moved towards each other, as shown in FIG. 10b. There will be a small middle portion of tape which will not be collected by either roller; it is released by switching off the appropriate final suction zone of the table. Moreover, it must be maintained taut, as shown in FIG. 10c.

During tape laying, one of the rollers 12 (that on the left of FIGS. 10d, e, and f) lays-up its tape first whilst the other is maintained stationary but in a condition in which it maintains tension in the tape between the two rollers.

Figure 10D:
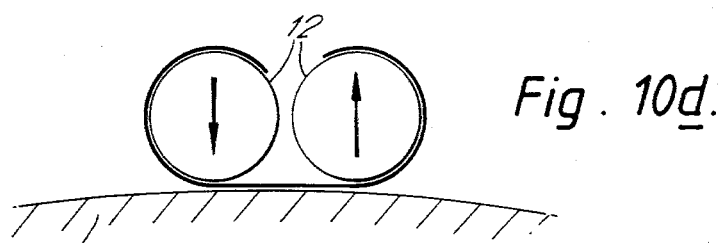

The left-hand roller is then lowered to contact the surface of the tool, as shown by the arrows in FIG. 10d; any extra tape required between the rollers to accommodate this movement is drawn from the right-hand roller.

Figure 10E:
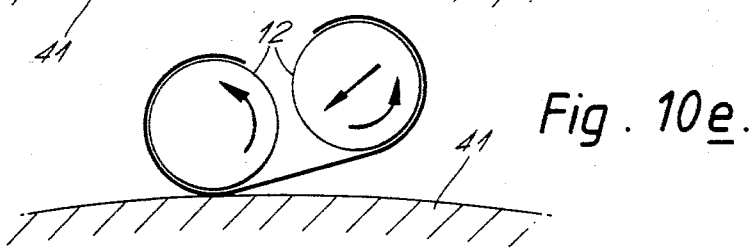
Figure 10F:
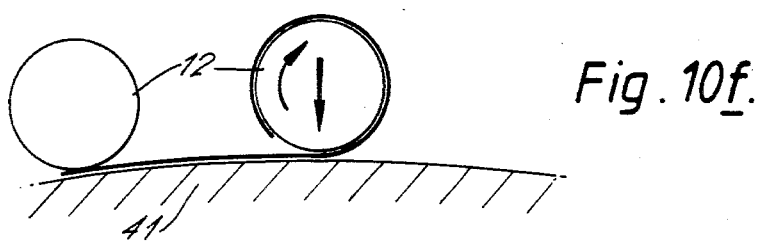

The left-hand roller will then roll to the left laying its tape upon the tool as it travels. This is shown in FIG. 10e. When the left-hand roller has travelled a distance of about one diameter, the second or right-hand roller will be brought down and as it descends any loose tape will be re-wound onto its surface. It is moved towards the left-hand roller before it makes contact with the tool surface to avoid a ridge in the laid tape. The tape on the right-hand roller is then laid by rolling that roller to the right.

During the tape laying process, the or each roller 12 is operated to periodically tension the deposited tape and thus to prevent the tape riding up in front of the roller 12 for example. One way of doing this is to raise the roller 12 from the tool surface, temporarily prevent it from rotating, and move it bodily (by traversing the head 13) in the direction of lay. Alternatively, the speed of rotation of the roller may be temporarily slowed compared with that speed chosen to achieve synchronism with the speed of traverse along the gantry.

We claim:

1. Automatic tape laying apparatus including surface means onto which portions of tape are laid for profiling to shape and size, tool means on which the profiled portions are laid-up to form an article to be cured, and transfer means for transferring the profiled portions from the surface means to the tool means and effecting laying-up thereon, the transfer means comprising carrier means having a generally arcuate surface region, drive means to roll the carrier means over a portion of tape upon the surface means, holding means arranged to hold the tape portion against the arcuate surface of the carrier means as the carrier means is rolled over said portion, traversing means to traverse the carrier means to a laying-up position over the tool means, said drive means effective to both urge the carrier means against and to roll over the tool means, and means to progressively release regions of the carried portion of tape as those regions lie between the arcuate surface and the tool means whereby the tape portion is progressively laid-up upon the tool means.

2. Automatic tape laying apparatus according to claim 1, in which the arcuate surface region of the carrier means is continuous such that the carrier means is in the form of a roller.

3. Automatic tape laying apparatus according to claim 1, wherein the arcuate surface means of the carrier means is of a compliant material.

4. Automatic tape laying apparatus according to claim 1, wherein the holding means for holding a tape portion onto the surface means comprises aperture means through which a suction is to be effected.

5. Automatic tape laying apparatus according to claim 4, wherein the aperture means are formed in discrete zones whereby suction may be applied selectively to these zones.

6. Automatic tape laying apparatus according to claim 2, wherein the roller is mounted for rotation on axle means, the axle means is provided with means to effect steering, tilting and axial movement of the roller during its roll over the tool means.

7. Automatic tape laying apparatus according to claim 1, wherein said surface means comprises a planar table with apertures through which a suction can be effected.

8. Automatic tape laying apparatus according to claim 7, wherein the apertures are zoned such that the suction can be selectively applied to said zones.

9. Automatic tape laying apparatus according to claim 1, wherein means are provided to remove scrap portions of tape from said surface means subsequent to profiling the tape portions laid thereon.

10. Automatic tape laying apparatus according to claim 9, wherein said scrap portion removal means comprise a matrix of pin elements, means to lower said pin elements onto the scrap portions of tape for impalement purposes, and means to prevent any pin elements from contacting a profiled tape portion to be laid-up.

11. Automatic tape laying apparatus according to claim 1, wherein said tool means is capable of stepped angular movement, whereby successive layers of laid-up tape portions may be of different orientation.

12. A method of automatic tape laying comprising the steps of dispensing a length of tape onto a planar surface, holding said tape length onto the surface by suction, profiling at least an end region of the tape length, removing any waste material from said profiling operation from the surface whilst retaining the profiled tape portion in position, rolling a roller over the profiled tape portion, progressively collecting and holding said portion around the roller by suction, translating the loaded roller to the vicinity of a tool surface, urging the roller against the tool surface such that the profiled tape portion is locally compressed between the two, and rolling the roller over the tool surface such that the profiled tape portion is progressively deposited upon the tool surface.

13. A method according to claim 12, wherein the suction holding the profiled tape portion to the surface is progressively removed as the tape portion is collected.

14. A method according to claim 12, wherein the suction for collecting the tape portion is progressively initiated around the roller as the roller passes over the tape portion.

15. A method according to claim 12, wherein suction is progressively stopped during rolling over the tool surface.

16. A method according to claim 15, wherein the suction is progressively replaced by blowing to urge the tape portion from the roller during rolling over the tool surface.

17. A method according to claim 12, wherein during rolling over the tool surface, the roller is both steered, tilted and moved axially to accommodate variations in tool contour.

18. A method according to claim 12, wherein during rolling over the tool surface, the roller is periodically moved additionally to its rolling movement to effect tensioning of the tape portion being laid up.

* * * * *